(12) United States Patent
Bansal (10) Patent No.: US 10,630,724 B2
(45) Date of Patent: Apr. 21, 2020

(54) SYSTEMS AND METHODS FOR NETWORK VULNERABILITY ASSESSMENT AND PROTECTION OF WI-FI NETWORKS USING A CLOUD-BASED SECURITY SYSTEM

(71) Applicant: Zscaler, Inc., San Jose, CA (US)

(72) Inventor: Abhinav Bansal, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 198 days.

(21) Appl. No.: 15/701,904

(22) Filed: Sep. 12, 2017

(65) Prior Publication Data
US 2019/0081981 A1 Mar. 14, 2019

(51) Int. Cl.
| G06F 12/14 | (2006.01) |
| H04L 29/06 | (2006.01) |
| H04L 12/26 | (2006.01) |
| H04W 12/12 | (2009.01) |
| H04W 12/00 | (2009.01) |
| H04W 84/12 | (2009.01) |

(52) U.S. Cl.
CPC .............. *H04L 63/20* (2013.01); *H04L 43/10* (2013.01); *H04L 63/10* (2013.01); *H04L 63/1433* (2013.01); *H04L 63/1441* (2013.01); *H04W 12/1202* (2019.01); *H04W 12/1208* (2019.01); *H04L 63/0421* (2013.01); *H04L 63/166* (2013.01); *H04W 12/001* (2019.01); *H04W 12/00505* (2019.01); *H04W 84/12* (2013.01)

(58) Field of Classification Search
None
See application file for complete search history.

(56) References Cited

U.S. PATENT DOCUMENTS

| 9,621,574 | B2 | 4/2017 | Desai et al. | |
| 10,068,089 | B1* | 9/2018 | Shavell | G06F 21/554 |
| 10,387,980 | B1* | 8/2019 | Shahidzadeh | H04L 63/08 |
| 2011/0167474 | A1* | 7/2011 | Sinha | G06F 21/51 726/1 |
| 2013/0018677 | A1* | 1/2013 | Chevrette | G06Q 40/08 705/4 |
| 2015/0143504 | A1 | 5/2015 | Desai et al. | |
| 2017/0223024 | A1 | 8/2017 | Desai et al. | |
| 2018/0124096 | A1* | 5/2018 | Schwartz | H04L 63/102 |
| 2018/0248863 | A1* | 8/2018 | Kao | H04L 63/08 |

* cited by examiner

*Primary Examiner* — Brandon S Hoffman
(74) *Attorney, Agent, or Firm* — Clements Bernard Walker Law; Lawrence A. Baratta, Jr.

(57) ABSTRACT

Systems and methods of assessing Wi-Fi network vulnerability and enforcing policy based thereon in a cloud-based security system include obtaining and storing security risk scores for a plurality of Wi-Fi networks based in part on analysis performed by user equipment in range of each of the plurality of Wi-Fi networks; detecting user equipment associated with the cloud-based security system either desiring to connect to or already connected to a Wi-Fi network; obtaining a security risk score of the Wi-Fi network; and enforcing policy for the user equipment based on the obtained security risk score of the Wi-Fi network.

18 Claims, 4 Drawing Sheets

SYSTEMS AND METHODS FOR NETWORK VULNERABILITY ASSESSMENT AND PROTECTION OF WI-FI NETWORKS USING A CLOUD-BASED SECURITY SYSTEM

FIELD OF THE DISCLOSURE

The present disclosure generally relates to networking systems and methods. More particularly, the present disclosure relates to systems and methods for network vulnerability assessment and protection of Wi-fi networks using a cloud-based security system.

BACKGROUND OF THE DISCLOSURE

There has been a staggering growth of mobile devices in the consumer and enterprise space. This has given cyber criminals new avenues for exploiting vulnerabilities in mobile operating systems. In this mobile world, public Wi-fi hotspots have become a hacker's paradise. A Wi-fi hotspot is a physical location where people may obtain Internet access via a Wireless Local Area Network (WLAN) using a router connected to an internet service provider. By setting up a free public Wi-fi Hotspot, an attacker can easily lure victims to connect their devices to their network and get internet access for free. An attacker can place these hotspots in publicly accessible locations like airports, coffee shops, etc. and naive users within the range of the network can simply use it and connect to the Internet. Since these Wi-fi hotspots do not challenge for any authentication, all the user's data goes in the clear which can be intercepted by anyone on the same network. Users generally have no way to know if it is secure or insecure to connect to a hotspot network. Advanced users may use a Virtual Private Network (VPN) to encrypt all their traffic. However, this is slower as the traffic is backhauled to a remote VPN gateway. Further, VPNs generally do not scale well in low powered mobile devices. Some enterprises have even gone to the extent of disabling Wi-fi access on a user's laptop or mobile device for any network except their own. This not only leads to lack of employees' productivity but also causes a lot of frustration as they cannot use their device to access the Internet even when it is available. The conundrum is that if the Wi-fi network is itself secure, there is no point of routing all the traffic via VPN in the first place. There is a huge gap today where users cannot distinguish a good network from a bad network.

BRIEF SUMMARY OF THE DISCLOSURE

In an exemplary embodiment, a method assessing Wi-Fi network vulnerability and enforcing policy based thereon in a cloud-based security system includes obtaining and storing security risk scores for a plurality of Wi-Fi networks based in part on analysis performed by user equipment in range of each of the plurality of Wi-Fi networks; detecting user equipment associated with the cloud-based security system either desiring to connect to or already connected to a Wi-Fi network; obtaining a security risk score of the Wi-Fi network; and enforcing policy for the user equipment based on the obtained security risk score of the Wi-Fi network. The security risk scores can be determined locally by an associated user equipment in range of each of the plurality of Wi-Fi networks based on a combination of a static analysis and a dynamic analysis. The static analysis and the dynamic analysis can be in part performed based on obtaining data from the cloud-based security system. The static analysis can include an analysis of physical properties/attributes of a Wi-Fi network, and wherein the physical properties/attributes can include any of security protocol and encryption standards, Service Set Identifier (SSID), Dynamic Host Configuration Protocol (DHCP) options, router properties based on Media Access Control (MAC) address, and geolocation.

The dynamic analysis can include a live sampling of Wi-Fi network data through one or more of pinging known malware and phishing sites to determine reachability; Secure Sockets Layer (SSL) interception checks to determine if man-in-the-middle SSL scanning is performed; Domain Name Server (DNS) redirection to determine if a DNS server is malicious; contacting known Botnet command and control servers and attempting to download benign files to determine if successful; scanning the Wi-Fi network for hosts and services that have potential for harm; and checking data loss prevention over the Wi-Fi network. The security risk scores can be determined locally by an associated user equipment in range of each of the plurality of Wi-Fi networks using an application operated on the user equipment. The security risk scores can be determined by a plurality of mobile devices spread across a geography and configured to monitor the plurality of Wi-Fi networks in range, to provide crowd sourced analysis of the plurality of Wi-Fi networks. The policy can include one of preventing the user equipment from associating with the Wi-Fi network or causing the user equipment to disassociate from the Wi-Fi network. The policy can include requiring the user equipment to utilize a secure tunnel over the Wi-Fi network to the cloud-based security system. The policy can include preventing the user equipment from accessing one or more sites and using one or more applications.

In another exemplary embodiment, a cloud node in a cloud-based security system configured to assess Wi-Fi network vulnerability and enforce policy based thereon includes a network interface; a processor communicatively coupled to the network interface; and memory storing instructions that, when executed, cause the processor to obtain and store security risk scores for a plurality of Wi-Fi networks based in part on analysis performed by user equipment in range of each of the plurality of Wi-Fi networks; detect user equipment associated with the cloud-based security system either desiring to connect to or already connected to a Wi-Fi network; obtain a security risk score of the Wi-Fi network; and enforce policy for the user equipment based on the obtained security risk score of the Wi-Fi network. The security risk scores can be determined locally by an associated user equipment in range of each of the plurality of Wi-Fi networks based on a combination of a static analysis and a dynamic analysis. The static analysis and the dynamic analysis can be in part performed based on obtaining data from the cloud-based security system. The static analysis can include an analysis of physical properties/attributes of a Wi-Fi network, and wherein the physical properties/attributes can include any of security protocol and encryption standards, Service Set Identifier (SSID), Dynamic Host Configuration Protocol (DHCP) options, router properties based on Media Access Control (MAC) address, and geolocation.

The dynamic analysis can include a live sampling of Wi-Fi network data through one or more of pinging known malware and phishing sites to determine reachability; Secure Sockets Layer (SSL) interception checks to determine if man-in-the-middle SSL scanning is performed; Domain Name Server (DNS) redirection to determine if a DNS server is malicious; contacting known Botnet command and control servers and attempting to download benign files to determine if successful; scanning the Wi-Fi network for hosts and services that have potential for harm; and checking data loss prevention over the Wi-Fi network. The security risk scores can be determined locally by an associated user equipment in range of each of the plurality of Wi-Fi networks using an application operated on the user equipment. The policy can include one of preventing the user equipment from associating with the Wi-Fi network or causing the user equipment to disassociate from the Wi-Fi network. The policy can include requiring the user equipment to utilize a secure tunnel over the Wi-Fi network to the cloud-based security system. The policy can include preventing the user equipment from accessing one or more sites and using one or more applications.

In a further exemplary embodiment, a cloud-based security system configured to assess Wi-Fi network vulnerability and enforce policy based thereon includes one or more cloud nodes; and a central authority communicatively coupled to the one or more cloud nodes, wherein the one or more cloud nodes are configured to obtain security risk scores for a plurality of Wi-Fi networks based in part on analysis performed by user equipment in range of each of the plurality of Wi-Fi networks and provide to the central authority; detect user equipment associated with the cloud-based security system either desiring to connect to or already connected to a Wi-Fi network; obtain a security risk score of the Wi-Fi network; and enforce policy for the user equipment based on the obtained security risk score of the Wi-Fi network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like;

DETAILED DESCRIPTION OF THE DISCLOSURE

In various exemplary embodiments, the present disclosure relates to systems and methods for network vulnerability assessment and protection of Wi-fi networks using a cloud-based security system. The systems and methods can include a network vulnerability assessment tool that gives a risk score. The risk score can be used as a recommendation to the users pertaining to the security of the network that they are trying to connect to or used by the cloud-based security system to block the user from connecting to an insecure network. The vulnerability assessment is done by doing live sampling of data on the network as well as by static analysis of physical properties of the network and matching that against a known set of signatures using a database in the cloud-based security system. By empowering users with this information, the users can take appropriate actions, for instance, in a secure network, they can continue using the Internet freely; in an insecure network, they can simply disconnect from the network or use a lightweight VPN tunnel such as through the cloud-based security system. Depending upon the security risk of the network, access to highly critical resources like banking websites, enterprise applications, or the like can be blocked by the cloud-based security system.

The systems and methods provide an opportunity for users to know whether they are connecting to a good or a malicious network. By performing multi-dimensional health checks of the network, the user can be informed of the network security risks involved. The systems and methods have the following advantages. First, end users can immediately know whether it is safe or not to connect to a network. Second, the recommendation system can be used by network providers to eliminate any security vulnerabilities in their network infrastructure and to gauge the level of the security standards that their network adheres to. They can also monitor the improvements in their networking infrastructure over time. Third, the recommendation system can use crowdsourcing to inform nearby mobile devices if they connect to the same malicious network. Fourth, the recommendation system can inform the user on the categories of websites that are unsafe to browse on the network using suggestions from the database in the cloud-based security system. Fifth, using properties like geolocation and global threat conditions, the recommendation system can deliver adaptive and predictive security to the end users. Sixth, enterprise IT administrators can use the system to monitor/protect mobile devices associated with enterprise users.

Exemplary Cloud System Architecture

Figure 1:
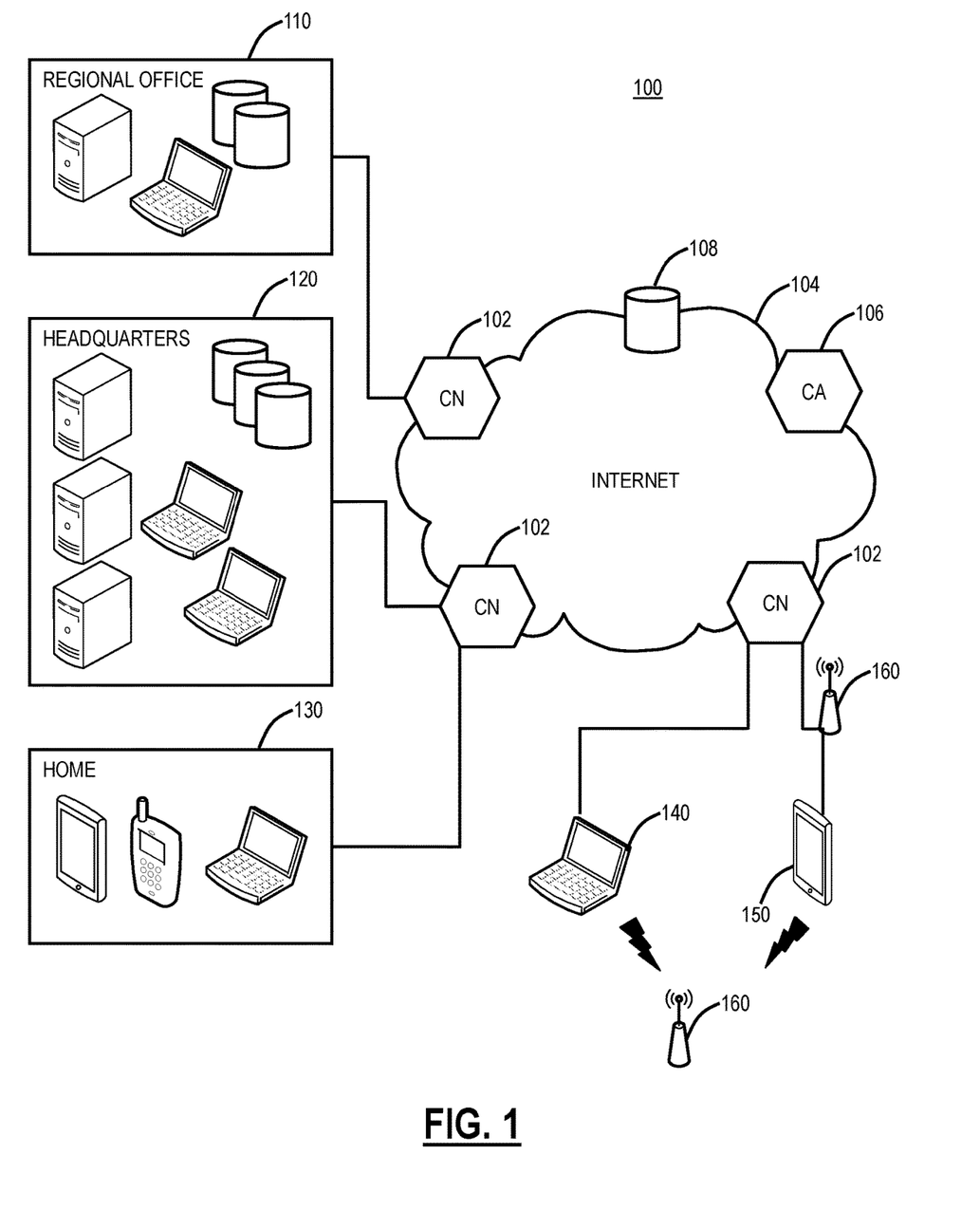
FIG. 1 is a network diagram of a cloud-based system for implementing various cloud-based service functions.
Figure 2:
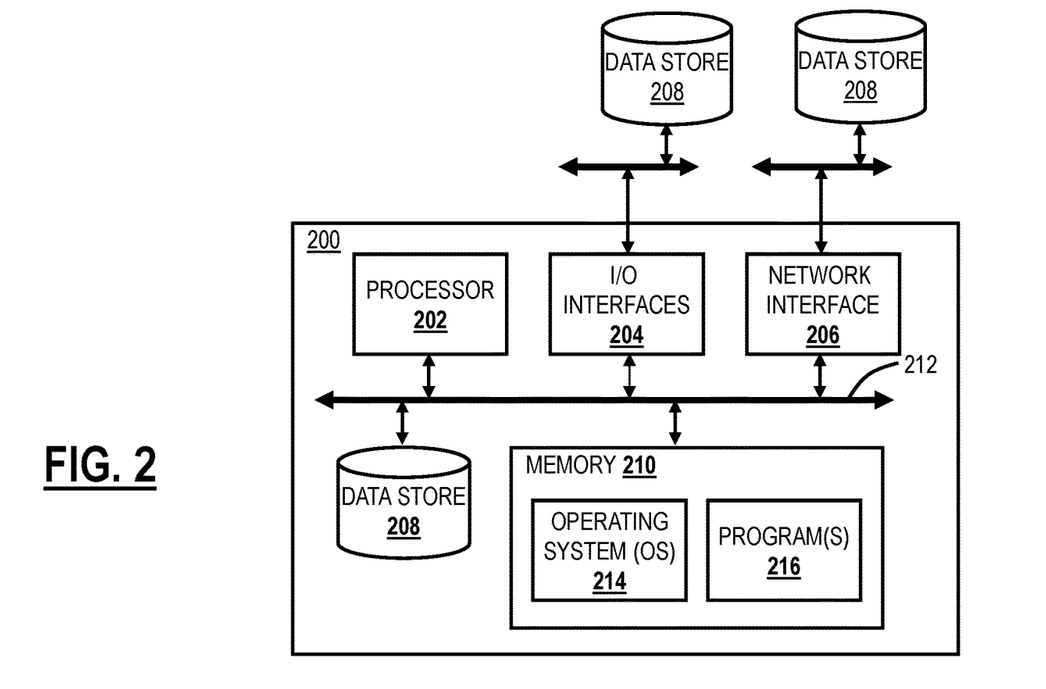
FIG. 2 is a block diagram of a server which may be used in the cloud-based system of FIG. 1, in other systems, or stand-alone.

Referring to FIG. 1, in an exemplary embodiment, a network diagram illustrates a cloud-based system 100 for implementing various cloud-based service functions. The cloud-based system 100 includes one or more cloud nodes (CN) 102 communicatively coupled to the Internet 104 or the like. Also, the cloud-based system 100 can also include one or more Central Authorities (CA) 106 and one or more log nodes 108, and each of the components 102, 106, 108 can be communicatively coupled to one another via the Internet 104. The cloud nodes 102, the central authorities 106, and the log nodes 108 may be implemented as a server 200 (as illustrated in FIG. 2), or the like, and can be geographically diverse from one another such as located at various data centers around the country or globe. For illustration purposes, the cloud-based system 100 can connect to a regional office 110, headquarters 120, various employee's homes 130, laptops/desktops 140, and mobile devices 150 each of which can be communicatively coupled to one of the cloud nodes 102 via the Internet 104. These locations 110, 120, 130 and devices 140, 150 are shown for illustrative purposes, and those skilled in the art will recognize there are various access scenarios to the cloud-based system 100 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, malware detection, bandwidth control, Data Leakage Prevention (DLP), zero-day vulnerability protection, web 2.0 features, and the like. In an exemplary embodiment, the cloud-based system 100 may be viewed as Security-as-a-Service through the cloud, such as the IA.

In an exemplary embodiment, the cloud-based system 100 can be configured to provide mobile device security and policy systems and methods. The mobile device 150 may be similar to the server 200 (as illustrated in FIG. 2) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

As a cloud-based security system, the cloud-based system 100 has a distributed network, multi-tenant architecture. The cloud-based system 10 is configured to examine traffic over all ports and protocols including SSL encrypted traffic. The policies are configured to follow the user, regardless of their location or device. The cloud-based system 100 can provide security functionality combining findings from various different approaches to deliver a holistic perspective. The cloud-based system 100 can be capable of recognizing threats independent of signature feeds, and the cloud-based system 100 can propagate threat information across the cloud in real-time, i.e., zero-day or zero-hour determinations such as between the cloud nodes 102 and the central authority 106.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 102) at any time for policy-based secure Internet access. Two exemplary services for the cloud-based system 100 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), DLP, and the like. The PA can include access control, micro service segmentation, etc. For example, the IA service can provide a user with Internet Access and the PA service can provide a user with access to enterprise resources in lieu of traditional Virtual Private Networks (VPNs).

The central authority 106 is a supervisory management node, i.e., the "brains" of the cloud-based security system. The central authority 106 manages and monitors all cloud nodes 102 and ensures that they are always up-to-date with the latest real-time feeds and software and that they are synchronized to propagate threat intelligence cloud-wide. The central authority 106 directs users to the closest cloud node 102, ensuring that policy follows the user with minimum latency. The central authorities 106 are a globally distributed peer-to-peer cluster with an automatically elected master. This ensures all cloud components can always talk to a central authority 106 even if there are major Internet 104 outages that isolate an entire region. Through its multi-tenant architecture, the central authority 106 provides each organization with its own secure portal to administer policy.

Any change to the policy is communicated to the cloud nodes 102 within seconds. The central authority 106 provides an end-user authentication framework through integration with Secure Lightweight Directory Access Protocol (LDAP) or ID Federation systems.

The cloud nodes 102 are configured to interface traffic with the users, e.g., the locations 110, 120, 130 and devices 140, 150. The cloud nodes 102 are configured to perform security, management, and compliance policies for the users, with the policies served by the central authority 106. The cloud nodes 102 can be an inline proxy that enforces policies on a user-level granularity. The cloud nodes 102 can scan every byte of a request, content, responses, and all related data for inline blocking of threats like viruses, cross site scripting (XSS), and botnets. This capability also enables Dynamic Content Classification (DCC) of unknown sites. By scanning each page, the cloud nodes 102 can determine a risk index for every page loaded that enables administrators to control content served to their users based on acceptable risk. The cloud nodes 102 can include authentication and policy distribution mechanisms that enables any user to connect to any cloud node 102 at any time enabling enterprises to simply point traffic to any cloud node 102 to ensure full policy enforcement while getting all reports back in real-time.

The log nodes 108 can be integrated with the cloud nodes 102 or separate. The log nodes 108 are configured to maintain logs of all user transactions, in a compressed manner. The logs can be transmitted every second to the log nodes 108 over secure connections from the cloud nodes 102, as well as a multicast to multiple servers for redundancy. The log nodes 108 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 108 can store and transfer logs in an encrypted format.

Exemplary Server Architecture

Referring to FIG. 2, in an exemplary embodiment, a block diagram illustrates a server 200 which may be used in the cloud-based system 100, in other systems, or standalone. For example, the cloud nodes 102, the central authority 106, and/or the log nodes 108 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
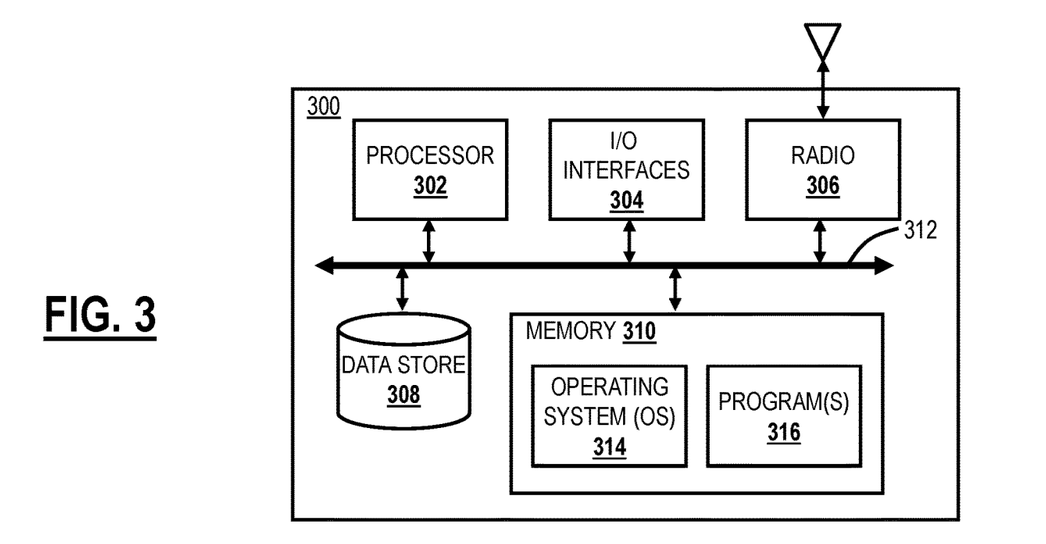

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

Wi-fi Network Vulnerability Assessment and Recommendation System

Variously, the present disclosure includes Wi-fi network vulnerability assessment and recommendation systems and methods. The systems and methods can be implemented in the cloud-based system 100 and more particularly in the cloud-based system 100 operating as a distributed security system. In FIG. 1, the laptops/desktops 140, the mobile devices 150, and other user equipment can connect to any number of Wi-fi networks 160. The Wi-fi networks 160 can be public Wi-fi hotspots and the like. Also, the user equipment can connect to the cloud-based system 100 via the Wi-fi networks 160. In an exemplary embodiment, the laptops/desktops 140, the mobile devices 150, and other user equipment can include multiple networking modes such as Wi-fi, cellular (LTE), etc. The objective of the systems and methods is to determine the risks of unknown Wi-fi networks 160.

The present disclosure describes a network vulnerability assessment and a policy system that uses a multidimensional approach to inform end users about the security risks of connecting to an unknown network (the Wi-fi networks 160) and to IT administrators about the security health of their own networks. Further, the cloud-based system 100 can enforce specific policies based on the results of the network vulnerability assessment, such as preventing access, requiring VPN connectivity, limiting application use, etc. As described herein, open Wi-fi networks proliferate in public places and offer free Internet access to all the users. Disadvantageously, it is very easy for hackers to set up their own spoofed version of network access points and innocent users who cannot distinguish between safe and unsafe access points, easily fall victims to data loss, financial theft, etc. Thus, it is imperative to determine risk and enforce policies accordingly with users accessing the Wi-fi networks 160.

Operation of the network vulnerability assessment and policy system is performed by the laptops/desktops 140, the mobile devices 150, and other user equipment in conjunction with the cloud nodes 102, the central authority 106, and the logging nodes 108. In particular, the laptops/desktops 140, the mobile devices 150, and other user equipment are configured to collect and optionally analyze data associated with the Wi-fi networks 160 and to report the same to the cloud nodes 102. The cloud nodes 102 in conjunction with the central authority 106 and the logging nodes 108 can maintain a database of Wi-fi networks 160 and associated risks. These aspects provide the network vulnerability assessment and based on this ongoing, crowd-sourced approach, the cloud-based system 100 has visibility of risk of the Wi-fi networks 160. When a user wishes to connect to a particular Wi-fi network 160, the policy system includes enforcement of specific policies based on the associated network vulnerability assessment of that Wi-fi network 160. Thus, the systems and methods include two phases—vulnerability assessment and policy enforcement based thereon.

Figure 4:
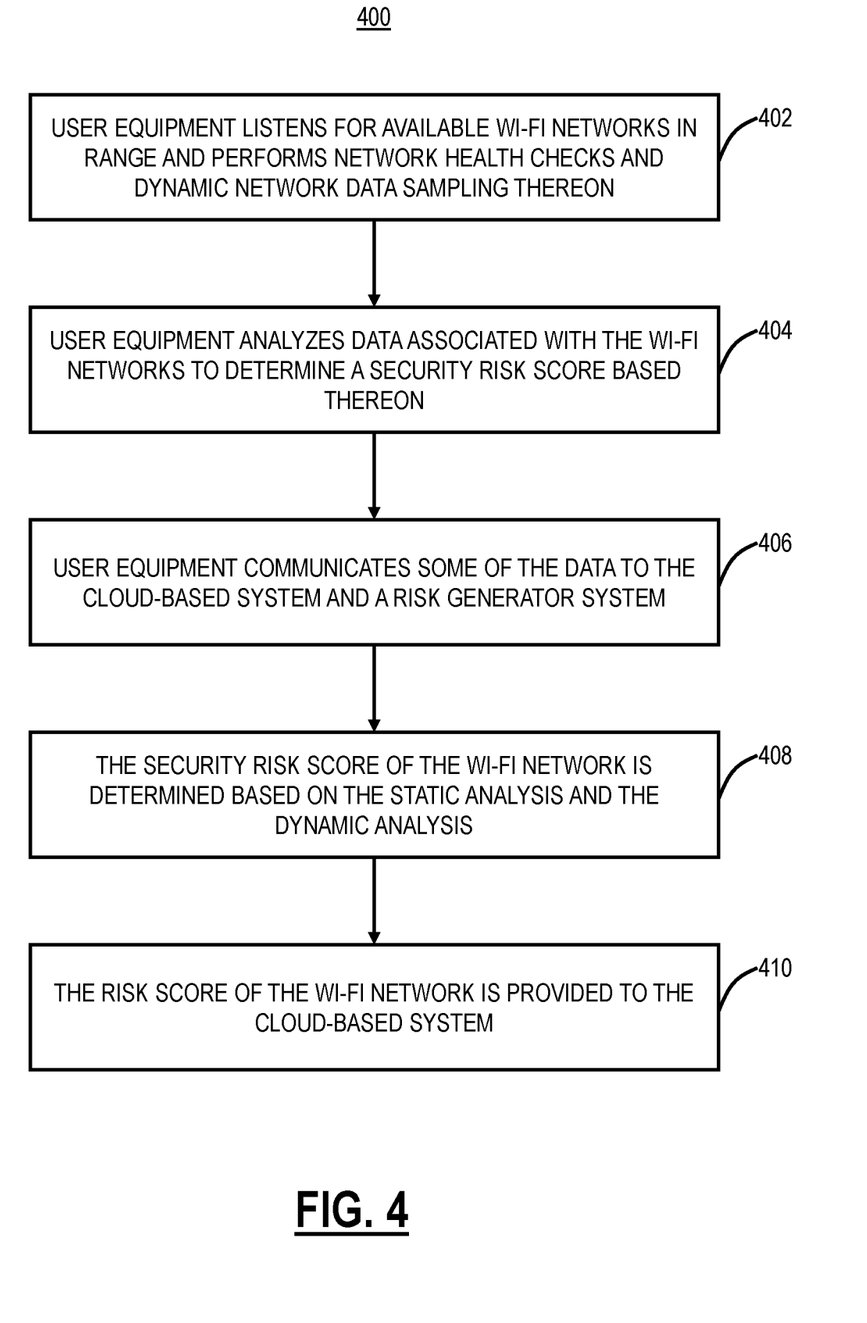
FIG. 4 is a flowchart of a user equipment-based wireless vulnerability process in conjunction with the cloud-based system.
Figure 5:
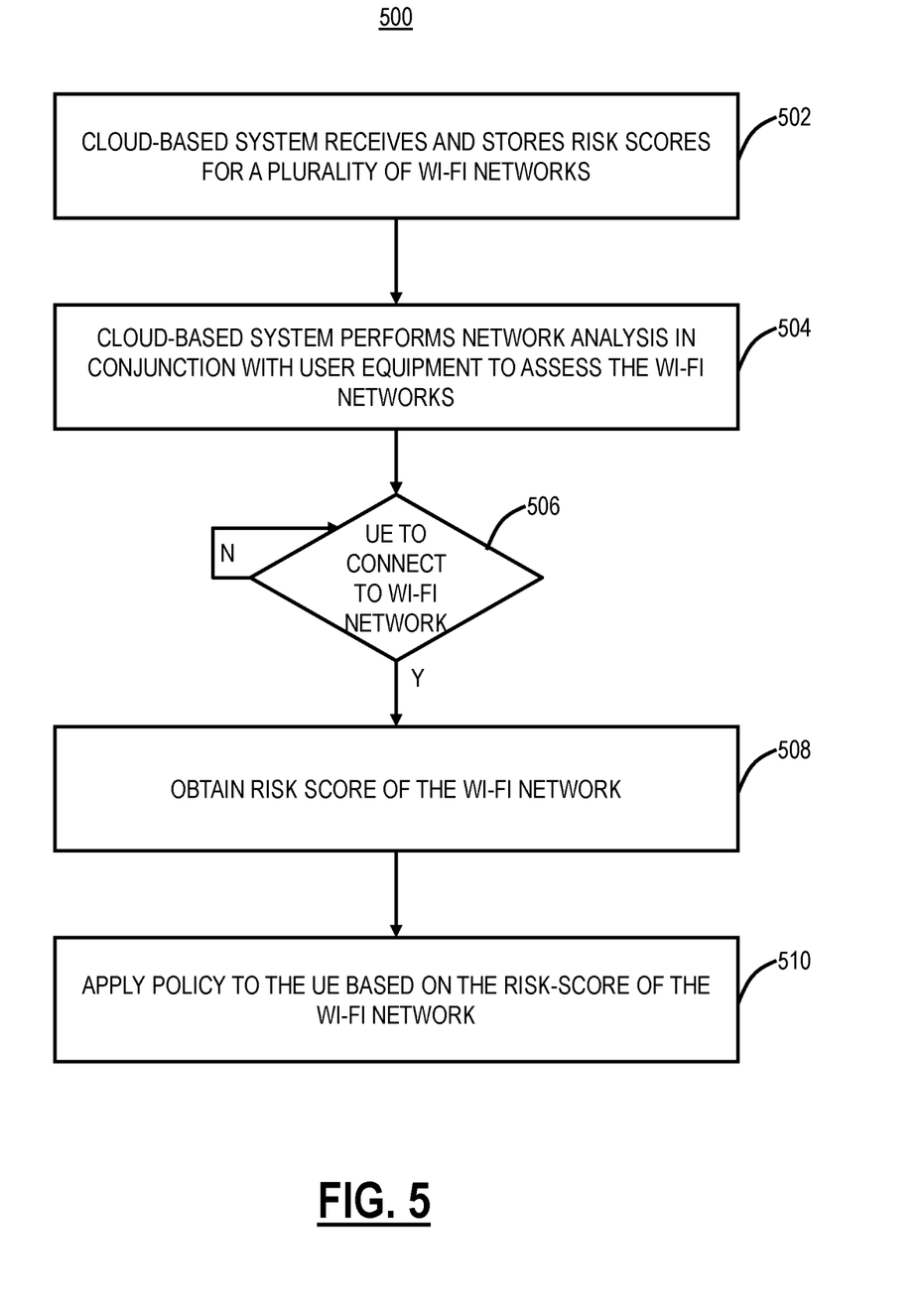
FIG. 5 is a flowchart of a cloud-based wireless vulnerability-based policy process to control connection and operation of the user equipment with Wi-fi networks.

Referring to FIG. 4, in an exemplary embodiment, a flowchart illustrates a user equipment-based wireless vulnerability process 400 in conjunction with the cloud-based system 100. Referring to FIG. 5, in an exemplary embodiment, a flowchart illustrates a cloud-based wireless vulnerability-based policy process 500 to control connection and operation of the user equipment with the Wi-fi networks 160. Specifically, the process 400 describes operations performed by a plurality of user equipment, i.e., the laptops/desktops 140, the mobile devices 150, and other user equipment, to assess the vulnerability of the Wi-fi networks 160 and provide the data to the cloud-based system 100. The process 500 describes operations performed by the cloud-based system 100, namely the cloud nodes 102, the central authority 106, and the logging nodes 108 to promulgate the vulnerability assessment of the Wi-fi networks 160 and to enforce end user policy.

In FIG. 4, the user equipment-based wireless vulnerability process 400 includes the user equipment listening for available Wi-Fi networks in range and performing network health checks and dynamic network data sampling thereon (step 402). Specifically, the laptops/desktops 140, the mobile devices 150, and other user equipment are configured to obtain data related to the Wi-Fi networks 160 in range here. In an exemplary embodiment, the user equipment can include a web/mobile application executed thereon for performing the process 400. In another exemplary embodiment, the user equipment can perform the process 400 at the direction of the cloud-based system 100. The process 400 leverages the widespread deployment of the laptops/desktops 140, the mobile devices 150, and other user equipment to crowd source analysis of various Wi-Fi networks 160.

The user equipment analyzes data associated with the Wi-Fi networks 160 to determine a security risk score based thereon (step 404). Specifically, the user equipment can be configured to locally determine the security risk score based on the obtained data in step 402 and the analysis in step 404. Other embodiments are also contemplated such as relaying the data or summaries thereof to the cloud-based system 100 which performs the analysis. The security risk score can be a weighted mean of various physical properties/attributes of the Wi-Fi network 160 and based on the dynamic network data sampling.

The physical properties/attributes of the Wi-Fi networks 160 include:

a. Security protocol and encryption standards adopted by the Wi-Fi network 160 such as WEP/WPA/WPA2 or none and the advertised key strength. For weighing purposes, open networks and outdated WEP protocols have maximum security risk, while WPA2 has minimum security risk;

b. Wi-fi Service Set Identifier (SSID)—comparing the SSID of the Wi-Fi network 160 against a database of known malicious Wi-fi SSID's obtained from crowdsourced data can be used to determine the risk score associated. For example, the database of known malicious Wi-fi SSID's can be located in the cloud-based system 100, and the user equipment can obtain this data based on communication;

c. Dynamic Host Configuration Protocol (DHCP) options such as Domain Name System (DNS) address and Web Proxy Auto-Discovery Protocol (WPAD) settings that can be used to redirect traffic to insecure destinations;

d. Router properties such as known malicious or insecure routers by fingerprinting Media Access Control (MAC) address and other attributes and comparing it against cloud database of known vulnerable devices;

e. Device geolocation—comparing the geolocation with known global threat conditions using a cloud database can give an indication of recent security incidents in the area; and f. Previous history of the Wi-Fi network 160.

In conjunction with the physical properties/attributes and analysis thereof, the user equipment may need to communicate to the cloud-based system. That is, the user equipment can communicate some of the data to the cloud-based system and a risk generator system (step 406). Specifically, the user equipment performs the process 400 to determine the security risk score, but the user equipment may need to get data for the analysis from the cloud-based system 100, e.g., the SSID comparison, the MAC address comparison, etc. Note, the user equipment may communicate through the Wi-Fi network 160 or through an alternate communication mechanism such as another Wi-Fi network 160, a cellular connection, etc. For example, the user equipment can be connected to the cellular network (or some other network) and perform the process 400 on various Wi-Fi networks 160 in range, but which are not connected to the user equipment.

In addition to the physical properties/attributes, the user equipment in step 406 can perform live sampling of network data and feed the results into a risk generator system in the cloud-based system 100. The data to fetch is controlled using a cloud security database which is kept up to date with all the recent malware threats. For example, the user equipment can perform the following steps once connected to a Wi-Fi network 160, one or more and in any order:

a. The user equipment can ping known malware and phishing web sites to determine reachability to known threats. A secure network is indicated if the access attempt to a known malicious website is blocked by the Wi-Fi network 160;

b. The user equipment can perform Secure Sockets Layer (SSL) interception checks to see if the Wi-Fi network 160 is doing man-in-the-middle SSL scanning and can flag the network as highly insecure if it does so;

c. The user equipment can look for DNS redirections to make sure the DNS server provided by the Wi-Fi network 160 is not malicious;

d. The user equipment can contact a known Botnet command and control server ('calling home') and download a benign file to see if it is successful in its attempt;

e. The user equipment can further scan the Wi-Fi network 160 for hosts and services that can potentially be harmful to the user or device by sending specially crafted packets on the Wi-Fi network 160; and f. The user equipment can perform advanced data loss prevention checks to perform behavioral analysis on the Wi-Fi network's 160 handling of user's sensitive data.

Once the physical properties/attributes and the results of the risk generator system are determined, the security risk score of the Wi-Fi network is determined based on the static analysis and the dynamic analysis (step 408). Specifically, the static analysis can be based on the physical properties/attributes, and the dynamic analysis can be based on the results of the risk generator system. The outputs of the static analysis and the dynamic analysis can be fed into a risk score determination process which outputs a security risk score for the Wi-Fi network 160. For example, the risk score determination process can be a weighted mean of all of the outputs. The weights of each output can be adjustable. In an exemplary embodiment, the security risk score can be a grade from A (secure) to F (insecure). In another exemplary embodiment, the security risk score can be a numerical value, e.g., 1 to 10, 1 to 100, etc. Various embodiments are contemplated. The security risk score of the Wi-Fi network 160 is provided to the cloud-based system 100.

In FIG. 5, the cloud-based wireless vulnerability-based policy process 500 includes the cloud-based system 100 receiving and storing the security risk scores for a plurality of Wi-Fi networks 160 (step 502). The security risk scores can be obtained based on the process 400, or other approaches. Here, the cloud-based system 100 maintains a database of Wi-Fi networks 160 and associated security risk scores. The cloud-based system 100 can uniquely identify the Wi-Fi networks 160 through a combination of SSID, MAC address, geolocation, and the like. Also, it is expected that the security risk scores can be obtained for the same Wi-Fi network 160 by different user equipment and at different times. The cloud-based system 100 can continually update the database of security risk scores, such as by using an aging factor which weighs more recent security risk scores higher than aged scores. Also, security risk scores can be removed over time.

The cloud-based system 100 can also perform network analysis in conjunction with the user equipment to assess the Wi-Fi networks 160 (step 504). Here, the cloud-based system 100 can cooperatively perform step 406 in the process 400. Also, the cloud-based system 100 can direct the user equipment to perform the process 400. For example, the user equipment can notify the cloud-based system 100 of a Wi-Fi network 160 in range and the cloud-based system 100 can instruct the user equipment on whether or not to perform the process 400 as well as include instructions on how to perform the process 400.

The laptops/desktops 140, the mobile devices 150, and other user equipment can use the cloud-based system 100 as an inline monitoring system as described herein. As such, the cloud-based system 100 can enforce policy on the user equipment for policy-based secure Internet access. In particular, the cloud node 102 associated with a user equipment can detect when the user equipment wishes to connect to a Wi-Fi network 160 (step 506). For example, a mobile device 150 can instruct the cloud node 102 via a cellular connection of the attempt to connect to the Wi-Fi network 160. Also, the laptops/desktops 140 can first connect to the Wi-Fi network 160 and then connect to the cloud-based network 100. That is, step 506 can occur either before the user equipment connects to the Wi-Fi network 160 or after.

When the cloud-based system 100 detects the attempt or the actual connection of the user equipment to the Wi-Fi network 160, the cloud node 102 obtains the security risk score of the Wi-Fi network 160 (step 508). In an exemplary embodiment, the database on security risk scores is persisted to all cloud nodes 102 and continually updated based on the central authority 106. In another exemplary embodiment, the database is maintained in the central authority 106 and/or the logging node 108 and queried by the cloud node 102.

The cloud-based system 100 is configured to apply policy to the user equipment based on the security risk score of the Wi-Fi network 160 (step 510). A key aspect of the systems and methods is the real-time crowd sourced data which can reflect the security risks of various Wi-Fi networks 160. With this data in the cloud-based system 100, various policies can be applied to the user equipment and/or to the connection by the user equipment to the Wi-Fi network 160. The policy can include a notification to the user, such as via an out-of-band notification, email, pop-up, etc. and/or a notification to an IT administrator. The notification to the user can provide the security risk score as well as recommendations for proper use of the Wi-Fi network 160, e.g., insecure network, limit activity, etc.

The policy can also include preventing the user equipment from joining the Wi-Fi network 160 or if the user equipment has already joined the Wi-Fi network 160, causing the user equipment to disassociate. This can be the case when the Wi-Fi network 160 has a poor security risk score.

The policy can also include requiring the user equipment to securely tunnel over the Wi-Fi network 160 to the cloud-based system 100, such as using a Virtual Private Network (VPN) or the like. This can be the case in insecure networks to still enable access but with the protection of the secure tunnel over the insecure Wi-Fi network 160.

The policy can also include limitations on application use based on the security risk score. For example, sensitive enterprise applications can be blocked on insecure Wi-Fi network 160 while web browsing is allowed.

Those skilled in the art will recognize various policies can be crafted and adjusted for each enterprise based on the security needs and the needs of its users with their roaming devices on the Wi-Fi networks 160. That is, the cloud-based system 100 can be multi-tenant (different enterprises each with their own configurable policies).

Throughout the processes 400, 500, the logging nodes 108 can maintain statistics of connectivity of the user equipment to the Wi-Fi networks to inform users and IT administrators of activity and remediation steps that should be taken. For example, a flag can be raised if a particular user continually associates with insecure Wi-Fi networks 160. The data collected from the analysis is uniquely stored in the cloud-based system 100 for future use. This also allows IT administrators to gauge improvements in the network security infrastructure over time.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method assessing Wi-Fi network vulnerability and enforcing policy based thereon in a cloud-based security system, the method comprising:
obtaining and storing security risk scores for a plurality of Wi-Fi networks based in part on analysis of physical properties of the plurality of Wi-Fi networks performed by user equipment in range of each of the plurality of Wi-Fi networks, the physical properties comprising at least one of Service Set Identifier (SSID), Dynamic Host Configuration Protocol (DHCP) options, geolocation, security protocol and encryption standards, and router properties;
detecting user equipment associated with the cloud-based security system either desiring to connect to or establishing a connection to a Wi-Fi network;
obtaining a security risk score of the Wi-Fi network from the user equipment associated with the cloud-based security system via one of a separate wireless network and the Wi-Fi network; and
enforcing policy for the user equipment associated with the cloud-based security system based on the obtained security risk score of the Wi-Fi network.

2. The method of claim 1, wherein the security risk scores are determined locally by an associated user equipment in range of each of the plurality of Wi-Fi networks based on a combination of a static analysis and a dynamic analysis of the physical properties.

3. The method of claim 2, wherein the static analysis and the dynamic analysis are in part performed based on obtaining data from the cloud-based security system.

4. The method of claim 2, wherein the dynamic analysis comprises a live sampling of Wi-Fi network data through one or more of:
pinging known malware and phishing sites to determine reachability;
Secure Sockets Layer (SSL) interception checks to determine if man-in-the-middle SSL scanning is performed;
Domain Name Server (DNS) redirection to determine if a DNS server is malicious; contacting known Botnet command and control servers and attempting to download benign files to determine if successful;
scanning the Wi-Fi network for hosts and services that have potential for harm; and checking data loss prevention over the Wi-Fi network.

5. The method of claim 1, wherein the security risk scores are determined locally by an associated user equipment in range of each of the plurality of Wi-Fi networks using an application operated on the user equipment.

6. The method of claim 1, wherein the security risk scores are determined by a plurality of mobile devices spread across a geography and configured to monitor the plurality of Wi-Fi networks in range, to provide crowd sourced analysis of the plurality of Wi-Fi networks.

7. The method of claim 1, wherein the policy comprises one of preventing the user equipment from associating with the Wi-Fi network or causing the user equipment to disassociate from the Wi-Fi network.

8. The method of claim 1, wherein the policy comprises requiring the user equipment to utilize a secure tunnel over the Wi-Fi network to the cloud-based security system.

9. The method of claim 1, wherein the policy comprises preventing the user equipment from accessing one or more sites and using one or more applications.

10. A cloud node in a cloud-based security system configured to assess Wi-Fi network vulnerability and enforce policy based thereon, the cloud node comprising:
a network interface;
a processor communicatively coupled to the network interface; and
memory storing instructions that, when executed, cause the processor to:
obtain and store security risk scores for a plurality of Wi-Fi networks based in part on analysis of physical properties of each of the plurality of Wi-Fi networks performed by user equipment in range of each of the plurality of Wi-Fi networks, the physical properties comprising at least one of Service Set Identifier (SSID), Dynamic Host Configuration Protocol (DHCP) options, geolocation, security protocol and encryption standards, and router properties;
detect user equipment associated with the cloud-based security system either desiring to connect to or establishing a connection to a Wi-Fi network;
obtain a security risk score of the Wi-Fi network from the user equipment associated with the cloud-based security system via one of a separate wireless network and the Wi-Fi network; and
enforce policy for the user equipment associated with the cloud-based security system based on the obtained security risk score of the Wi-Fi network.

11. The cloud node of claim 10, wherein the security risk scores are determined locally by an associated user equipment in range of each of the plurality of Wi-Fi networks based on a combination of a static analysis and a dynamic analysis of the physical properties.

12. The cloud node of claim 11, wherein the static analysis and the dynamic analysis are in part performed based on obtaining data from the cloud-based security system.

13. The cloud node of claim 11, wherein the dynamic analysis comprises a live sampling of Wi-Fi network data through one or more of:
pinging known malware and phishing sites to determine reachability;
Secure Sockets Layer (SSL) interception checks to determine if man-in-the-middle SSL scanning is performed;
Domain Name Server (DNS) redirection to determine if a DNS server is malicious; contacting known Botnet command and control servers and attempting to download benign files to determine if successful;
scanning the Wi-Fi network for hosts and services that have potential for harm; and checking data loss prevention over the Wi-Fi network.

14. The cloud node of claim 10, wherein the security risk scores are determined locally by an associated user equipment in range of each of the plurality of Wi-Fi networks using an application operated on the user equipment.

15. The cloud node of claim 10, wherein the policy comprises one of preventing the user equipment from associating with the Wi-Fi network or causing the user equipment to disassociate from the Wi-Fi network.

16. The cloud node of claim 10, wherein the policy comprises requiring the user equipment to utilize a secure tunnel over the Wi-Fi network to the cloud-based security system.

17. The cloud node of claim 10, wherein the policy comprises preventing the user equipment from accessing one or more sites and using one or more applications.

18. A cloud-based security system configured to assess Wi-Fi network vulnerability and enforce policy based thereon, the cloud-based security system comprising:
one or more cloud nodes; and
a central authority communicatively coupled to the one or more cloud nodes, wherein the one or more cloud nodes are configured to obtain security risk scores for a plurality of Wi-Fi networks based in part on analysis of physical properties of each of the plurality of Wi-Fi networks performed by user equipment in range of each of the plurality of Wi-Fi networks and provide to the central authority, the physical properties comprising at least one of Service Set Identifier (SSID), Dynamic Host Configuration Protocol (DHCP) options, geolocation, security protocol and encryption standards, and router properties;
detect user equipment associated with the cloud-based security system either desiring to connect to or establishing a connection to a Wi-Fi network;
obtain a security risk score of the Wi-Fi network from the user equipment associated with the cloud-based security system via one of a separate wireless network and the Wi-Fi network; and enforce policy for the user equipment associated with the cloud-based security system based on the obtained security risk score of the Wi-Fi network.

* * * * *